United States Patent [19]

Traver et al.

[11] Patent Number: 4,689,248

[45] Date of Patent: Aug. 25, 1987

[54] SILICONE COATED OPTICAL FIBERS

[75] Inventors: Frank J. Traver, Troy; Simon M. John, Ballston Lake; Duane F. Merrill, Ballston Spa, all of N.Y.

[73] Assignee: General Electric Company, Waterford, N.Y.

[21] Appl. No.: 890,045

[22] Filed: Jul. 28, 1986

Related U.S. Application Data

[62] Division of Ser. No. 742,253, Jun. 7, 1985, Pat. No. 4,623,700.

[51] Int. Cl.$^4$ .................. B05D 5/06; G02B 6/02; G02B 6/10
[52] U.S. Cl. .................. 427/168; 350/96.29; 350/96.3; 427/165; 427/169; 427/387; 428/378; 428/447
[58] Field of Search .................. 350/96.29, 96.3; 428/447, 378; 427/165, 168, 169

[56] References Cited

U.S. PATENT DOCUMENTS

| | | | |
|---|---|---|---|
| 3,344,111 | 9/1967 | Chalk | 525/478 |
| 3,932,555 | 1/1976 | Goodrich et al. | 525/478 |
| 4,041,010 | 8/1977 | Jeram | 525/478 |
| 4,077,943 | 3/1978 | Sato et al. | 525/478 |
| 4,166,078 | 8/1979 | Getson | 525/478 |
| 4,234,713 | 11/1980 | Le Grow | 525/478 |
| 4,472,470 | 9/1984 | Modic | 428/447 |
| 4,476,166 | 10/1984 | Eckberg | 525/478 |

Primary Examiner—Wilbert J. Briggs, Sr.
Attorney, Agent, or Firm—Gary L. Loser; John W. Harbour

[57] ABSTRACT

The present invention provides curable silicone compositions, comprising:
(a) a substantially linear olefinic group-containing polydiorganosiloxane;
(b) a resinous olefinic group-containing polysiloxane;
(c) a reactive organic monomer;
(d) an organohydrogenpolysiloxane, and
(e) a hydrosilation catalyst.

There are also provided articles of manufacture prepared by coating substrates such as optical fibers with said composition as well as methods for making said curable compositions and articles of manufacture.

22 Claims, No Drawings

SILICONE COATED OPTICAL FIBERS

This application is a division, of application Ser. No. 742,253, filed 06/07/85, now U.S. Pat. No. 4,623,700.

BACKGROUND OF THE INVENTION

The present invention relates to optical fibers coated with novel silicone compositions. More particularly, the present invention relates to optical fibers having a silicone cladding or protective coating thereon, said silicone composition comprising the reaction product of a silicone fluid, a silicone resin, and a reactive organic monomer such as an alpha olefin.

The emerging field of light wave telecommunications makes use of light to transmit information through a transparent medium in a way comparable to transmitting electricity through a copper wire. The advantage of such optical telecommunications over the presently employed electromagnetic systems is that it has the potential to accomodate thousands of times more communications traffic than radio communications.

Since the discovery of lasers the only technical obstacle to lightwave communications over great distances has been the development of a suitable transmission medium. Air, for example, although penetrable by light, is unsuitable because rain, fog and other atmospheric conditions can weaken the light signal. Development of the glass fiber lightguide, or optical fiber, provided an excellent and relatively inexpensive transmission medium.

Modern optical fibers typically consist of a core of high transparency silica glass which transmits the light surrounded by a protective or cladding layer. Such protective coatings not only insulate the optical fiber from the environment, but also act as an internal mirror reflecting the light back into the core, thus preventing loss of the light signal outside the optical path.

In the production of fiber optics cable for telecommunications, the material used as the protective layer must be very flexible, not adhere too closely to the glass fiber core, and maintain its integrity and optical characteristics in changing environments, including temperature cycles of from -50° C. to 80° C. It is also desirable that the protective layer be easily strippable so that the integrity of the fiber can readily be checked.

The prior art discloses various silicone compositions which are expressly said to be suitable as a coating composition for optical fibers, and silicone compositions which do not refer to their suitability for such use, typically because they were invented before the present optical fiber technology was developed.

Included in the first class is Suzuki, U.S. Pat. No. 4,380,367, which discloses a coating for optical fibers, comprising:

(a) 100 parts by weight of a vinyl group terminated methylphenylpolysiloxane having a viscosity at 25° C. of 100 to 15,000 centipoise and with a methyl/phenyl molar ratio of from 1/1 to 10/1;

(b) an organohydrogenpolysiloxane selected from methylhydrogenpolysiloxanes having a viscosity at 25° C. of from 0.7 to 5000 centipoise and containing at least three silicon-bonded hydrogen atoms per molecule, and methylphenylhydrogenpolysiloxanes having a viscosity at 25° C. of 0.7 to 5000 centipoise and containing at least three silicon-bonded hydrogen atoms per molecule, with a methyl/phenyl molar ratio not smaller than 1/1, the amount of (b) being an amount which provides a molar ratio of silicon-bonded hydrogen atoms in (b) to silicon-bonded vinyl groups in (a) which ranges from 0.8/1 to 10/1; and (c) 0.5 to 1000 ppm precious metal or precious metal containing hydrosilation catalyst, as precious metal based on the total amount of (a) and (b).

Included in the latter class is Dallavia, U.S. Pat. application Ser. No. 538,093, filed Oct. 3, 1983, now U.S. Pat. No. 4,526,953 and incorporated by reference into the present disclosure. Dallavia discloses curable silicone compositions particularly suitable as release coating compositions which comprise:

(a) an addition curable diorganopolysiloxane base polymer having up to about 20 percent by weight alkenyl functional groups and having a viscosity of from about 50 centipoise to about 100,000 centipoise at 25° C.;

(b) an SiH-containing polysiloxane crosslinking agent having up to 100 percent by weight SiH-containing siloxy groups and having a viscosity in the range of 15 centipoise to 1000 centipoise at 25° C.;

(c) an effective amount of precious metal or precious metal containing catalyst to promote an addition cure hydrosilation reaction between said base polymer and said crosslinking agent; and (d) an amount of α-olefin or mixture α-olefins having up to about 30 carbon atoms effective to enhance said addition cure.

Nelson, U.S. Pat. No. 3,284,406, discloses a composition consisting essentially of:

(a) a polysiloxane of the formula

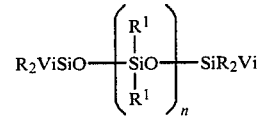

where R and $R^1$ are phenyl or methyl and at least 80 mol percent of the $R^1$ groups are methyl, said polysiloxane having a viscosity of from 500 to 500,000 centipoise at 25° C.;

(b) from 5 to 50 percent by weight based on the weight of (a) and (b) of a copolymer of $SiO_2$ units, $(CH_3)_3SiO_{0.5}$ units and $(CH_3)_2(CH_2=CH)SiO_{0.5}$ units, wherein there is from 1.5 to 3.5 weight percent vinyl groups based on the weight of (b), and the ratio of $(CH_3)_2(CH_2=CH)SiO_{0.5}$ units to $SiO_2$ units is from 0.6:1 to 1:1;

(c) a compound compatible with (a) and (b) which is a siloxane containing from 0.1 to 1.7 percent by weight siliconbonded hydrogen atoms, the remaining valences of the silicon atoms in (c) being satisfied by methyl or phenyl radicals, there being at least three silicon-bonded hydrogen atoms per molecule, and the amount of (c) being such that there is from 0.75 mol of SiH per mol of vinyl radicals in (a) and (b); and (d) a platinum catalyst.

Modic, U.S. Pat. No. 3,436,366, discloses a composition (a) a vinyl chainstopped polysiloxane having a viscosity of from 50,000 to 750,000 centipoise at 25° C., (b) an organopolysiloxane copolymer comprising trimethylsiloxane units, methylvinylsiloxane units and $SiO_2$ units, where from about 2.5 to 10 mole percent of the silicon atoms contain silicon-bonded vinyl groups and where the ratio of trimethylsiloxane units to $SiO_2$ units is from 0.5:1 to 1:1;

(c) a platinum catalyst and (d) an organohydrogenpolysiloxane crosslinking agent.

It has now been discovered that protective coatings for optical fibers can be prepared from curable silicone compositions, comprising:

(a) a substantially linear olefinic group-containing polydiorganosiloxane;

(b) a resinous olefinic group-containing polysiloxane;

(c) a reactive organic monomer;

(d) an organohydrogenpolysiloxane crosslinking agent; and (e) an effective amount of precious metal or precious metal containing hydrosilation catalyst.

SUMMARY OF THE INVENTION

It is one object of the present invention to provide curable silicone compositions useful as protective cladding for optical fibers.

It is another object of the present invention to provide curable silicone compositions which can be applied to optical fibers at high speeds substantially free of bubbles and which cure rapidly upon exposure to elevated temperatures.

Another object of the present invention is to provide optical fibers coated with novel silicone compositions.

Still another object of the present invention is to provide methods for making novel curable silicone compositions and optical fibers coated with said novel curable silicone compositions.

These and other objects are accomplished herein by a curable silicone composition, comprising:

(a) a substantially linear olefinic group-containing polydiorganosiloxane;

(b) a resinous olefinic group-containing polysiloxane;

(c) a reactive organic monomer;

(d) an organohydrogenpolysiloxane crosslinking agent; and (e) an effective amount of precious metal or precious metal containing hydrosilation catalyst.

DESCRIPTION OF THE INVENTION

In accordance with one aspect of the present invention there is provided a curable silicone composition, comprising:

(a) a substantially linear olefinic group-containing polydiorganosiloxane;

(b) a resinous olefinic group-containing polysiloxane;

(c) a reactive organic monomer;

(d) an organohydrogenpolysiloxane crosslinking agent; and (e) an effective amount of precious metal or precious metal containing hydrosilation catalyst.

In accordance with another aspect of the present invention there is provided a method for making coated optical fibers, comprising:

I. applying to a core fiber of high transparency silica glass a curable silicone composition, comprising:

(a) a substantially linear olefinic group-containing polydiorganosiloxane;

(b) a resinous olefinic group-containing polysiloxane;

(c) a reactive organic monomer;

(d) an organohydrogenpolysiloxane crosslinking agent; and (e) an effective amount of precious metal or precious metal containing hydrosilation catalyst; and II. exposing the coated core fiber of high transparency silica glass to an elevated temperature for an amount of time sufficient to cure said silicone composition to said core fiber of high transparency silica glass.

Component (a) of the curable silicone composition of the present invention can be any silicone polymer known in the art which contains the requisite olefinic groups. Generally, component (a) is an alkenyl-terminated polydiorganosiloxane having the general formula

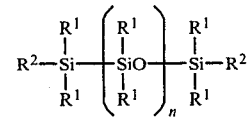

where each $R^1$ is an independently selected monovalent substituted or unsubstituted, saturated or unsaturated hydrocarbon radical, $R^2$ is an alkenyl radical, preferably vinyl or allyl, and n is a number sufficient to provide a viscosity of from about 10 centipoise to about 5,000,000 centipoise at 25° C. Preferably, the $R^1$ groups are methyl radicals or a mixture of methyl and phenyl radicals, and, preferably, the viscosity ranges from about 100 centipoise to about 1,000,000 centipoise at 25° C. More preferably, the viscosity ranges from about 1000 centipoise to about 250,000 centipoise at 25° C. The $R^2$ radicals, in addition to vinyl and allyl, can be any aliphatically unsaturated radicals which are capable of reacting with silicon-bonded hydrogen atoms and includes, for example, butenyl, hexenyl, octenyl, butynyl, pentynyl, and the like. Of course, there may be utilized mixtures of various olefin-containing polydiorganosiloxanes in the practice of the present invention. Those of ordinary skill in the art will be able to ascertain other suitable olefinic group-containing polydiorganosiloxanes without undue experimentation.

Component (b) of the present invention can be any resinous, olefinic group-containing polysiloxane known in the art. Preferably, silicone resin (b) is an MQ or MDQ resin having from about 1.5 to about 10 mol percent of siloxy units containing silicon bonded alkenyl groups. Preferably, such alkenyl groups are vinyl or allyl and most preferably are vinyl units. It should be noted that in the MDQ resins the alkenyl groups can be bonded to either or both of the monofunctional and difunctional siloxy units, however, it is preferable that only the difunctional siloxy units contain the alkenyl groups.

In both the MQ and MDQ resins the organo groups which are not alkenyl groups can be any hydrocarbon groups free of aliphatic unsaturation. Most preferably, such groups are methyl and phenyl or a mixture thereof.

In practicing the present invention there is typically employed from about 50 to about 400 parts by weight of resin or mixture of such resins per 100 parts by weight of component (a). Preferably there is utilized from about 150 to about 250 parts by weight of resinous olefinic group-containing polysiloxane (b) per 100 parts by weight of polydiorganosiloxane (a). Of course, more or less silicone resin may be used for applications other than coating optical fibers without departing from the spirit of the invention or the scope of the appended claims.

Generally, the various types of siloxane units in component (b) are selected so that the ratio of M units to Q units is from about 0.5:1 to about 1:1. Additionally, the D units are normally not present in an amount exceeding 10 mole percent of the total number of siloxy units.

The resins of component (b) typically are solid resinous materials and most often are commercially available as a solution in a solvent such as toluene or xylene, for example, as a 40 to 70 percent by weight solution. For ease of handling, component (b) can be dissolved in some or all of olefincontaining polysiloxane (a) and the solvent stripped from the resulting solution to produce a solution of component (b) in component (a).

Component (c) of the present invention includes all organic monomers which are capable of reacting with the hydrogen atoms of component (d). Such reactive organic monomers are often referred to in the art as reactive diluents.

The preferred reactive monomers for practicing the present invention are α-olefins of the type described in U.S. Pat. application Ser. No. 538,093 (Dallavia), filed Oct. 3, 1983, now allowed and incorporated herein by reference. Generally, such α-olefins are straight-chain hydrocarbons which contain a terminal double bond and may be characterized by the general formula

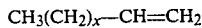

where x is an integer from 1 to about 30. The only limiting factor in practice is that as x increases beyond 30, the solubility of the α-olefin in the silicone components decreases. Preferably x ranges from about 13 to about 27.

These α-olefin possess a number of properties which make them particularly suitable for use in silicone compositions used as cladding for optical fibers. The α-olefins impart many of the advantageous properties of organic compositions to the silicone; thus, for example, the silicone component does not require that phenyl groups be present in order to obtain the necessary refractive index. Such α-olefins are also substantially less expensive than silicones thereby reducing the overall cost of the curable composition and the optical fiber coated therewith. These α-olefins can be added directly to the silicone components to a level of about 40 percent by weight without significantly affecting the cure or properties of the silicone components.

The high reactivity of the terminal double bond of the α-olefins in precious metal catalyzed addition reactions allows them to be used in applications where very rapid curing is essential. The volatility of α-olefins varies greatly depending upon the molecular weight, for the preferred $C_{16}$ to $C_{30}$ α-olefins flash points range from about 132° C. to about 265° C. It is also noteworthy that α-olefins have been shown have little or no toxic eff except where extensively inhaled; oral and dermal $LD_{50}$ values are in excess of 10 grams/kg, and skin and eye irritation are minimal. This combination of cost effectiveness, silicone solubility, cure compatibility, low volatility and low toxicity make α-olefins excellent modifiers for the present invention.

Preferably, the reactive organic monomers are present in an amount ranging from about 0.5 to about 25 percent by weight based on the weight of components (a) and (b). More preferably, the reactive organic monomer is present in an amount ranging from about 2.5 to about 20 percent by weight and, most preferably, is present in an amount of from about 5 to about 15 percent by weight based on the weight of components (a) and (b).

Other suitable reactive organic monomers can be readily ascertained by the artisan without undue experimentation and includes, for example, compositions such as Chemlink 2000, an acrylated α, ω $C_{12}$–$C_{14}$ aliphatic diol available from Santomer Corporation.

Component (d) can be any organohydrogenpolysiloxane known in the art, and can be a linear organohydrogen fluid, a resinous organohydrogenpolysiloxane, or a mixture thereof. Generally, the organohydrogenpolysiloxane crosslinking agents useful in the present invention contain an average of at least three silicon-bonded hydrogen atoms per molecule. The remaining valences of the silicon atoms are satisfied by oxygen atoms. The organohydrogenpolysiloxanes can be homopolymers, copolymers and mixtures thereof which contain units selected from, for example, dimethyl siloxane units, methylhydrogensiloxane units, dimethylhydrogensiloxane units, trimethylsiloxane units and $SiO_2$ units. Some specific examples of organohydrogenpolysiloxanes include polymethylhydrogensiloxane cyclics; copolymers of trimethylsiloxy and methylhydrogensiloxy units; copolymers of dimethylhydrogensiloxy units and methylhydrogensiloxy units; copolymers of trimethylsiloxy, dimethylsiloxy and methylhydrogensiloxy units; and copolymers of dimethylhydrogensiloxy, dimethylsiloxy and methylhydrogensiloxy units.

The amount of organohydrogenpolysiloxane present is generally an amount sufficient to provide from about 0.8 to about 3 silicon-bonded hydrogen atoms per alkenyl radical in components (a), (b) and (c).

Component (e) is a precious metal or precious metal-containing catalyst effective for initiating or promoting a hydrosilation cure reaction (referred to hereinafter simply as a precious metal catalyst or hydrosilation catalyst). The precious metal catalyst used in the practice of the present invention includes all of the well known platinum and rhodium catalysts which are effective for catalyzing the reaction between silicon-bonded hydrogen atoms and alkenyl radicals. These materials especially include the platinum hydrocarbon complexes described in U.S. Pat. Nos. 3,159,601 and 3,159,662 to Ashby, and the platinum alcoholate catalysts described in U.S. Pat. No. 3,220,970 to Lamoreaux, as well as the platinum catalysts of U.S. Pat. No. 3,814,730 to Karstedt. Additionally, the platinum chloride-olefin complexes described in U.S. Pat. No. 3,516,946 to Modic are useful herein. All of the aforesaid patents relating to suitable catalysts are incorporated by reference into the present disclosure.

Other suitable hydrosilation catalysts are well known in the art and can be, for example, complexes of the metals ruthenium, palladium, osmium and irridium.

Typically, the amount of hydrosilation catalyst employed ranges from about 1 ppm to about 500 ppm, as precious metal, based on the total weight of the composition. Preferably, the amount of precious metal catalyst is from about 10 to about 150 ppm, as precious metal, based on the weight of components (a), (b) and (c).

Additional ingredients may be added to the curable compositions described herein to lend specific properties and to allow the compositions to be tailored to the user's needs. Illustrative of commonly included additional ingredients are cure inhibitors, for example, as described in U.S. Pat. No. 4,256,870 to Eckberg and vinyl gum cure accelerators such as those described in U.S. Pat. No. 4,340,647 to Eckberg. Other conventional additives are also intended to be within the scope of the appended claims.

Although the compositions of the present invention can be prepared by merely mixing the various components together in a suitable manner, it is usually most convenient to prepare these compositions in two or more separate packages which are combined at the time the composition is to be applied and cured to the optical fiber.

In the case of a two package formulation it is preferable that one package include the substantially linear olefinic group-containing polydiorganosiloxane (a), the resinous olefinic group-containing polysiloxane (b), the reactive organic monomer (c) and the precious metal catalyst (e). The second package contains as its sole essential ingredient organohydrogenpolysiloxane (d), but as a matter of convenience, the second package also contains a portion of at least one of components (a), (b) and (c). Those skilled in the art are familiar with such two package systems, hence, a detailed discussion is not necessary. It is noteworthy, however, that an especially suitable multicomponent packaging system can be derived from the teachings of U.S. Pat. No. 4,448,415 to Eckberg, which is incorporated herein by reference.

Application of the curable silicone coating composition of the present invention to an optical communication glass fiber can be carried out by any method known in the art, for example, dipping or spraying. Curing is normally effected by passing the coated optical fiber through an oven maintained at a temperature of from about 200° C. to about 900° C. for a period ranging from about 0.1 to about 5 seconds.

In order that those skilled in the art might be better able to practice the present invention, the following examples are provided by way of illustration and not by way of limitation. All parts are by weight unless otherwise stated.

EXAMPLES

EXAMPLE 1

To a one liter three neck flask equipped with a mechanical stirrer, vacuum take off adapter, 75° angle adapter (head), condensor, thermometer, receiving flask and thermal controller there was added 400 grams of a trimethylsiloxy-methylvinylsiloxy-tetrasiloxy resin (e.g. $MD^{vi}Q$) as 60% solids in xylene and 160 grams of vinyl terminated polydimethylsiloxane having a viscosity of about 3500 centipoise at 25° C. The contents of the flask were than heated to 150° C. at 30 mm Hg. The solvent was collected in the receiving flask leaving a clear stripped liquid polydimethylsiloxane fluid containing the $MD^{vi}Q$ resin. The viscosity of this material was greater than 2 million centipoise at 25° C. The resin to polymer ratio, on a mole basis, was 60:40. To 100 grams of the fluid-resin solution there was added 10 grams of Chemlink 2000 (an acrylated α. ω $C_{12}$–$C_{14}$ aliphatic diol from Santomer Corp.). The acrylate was dispersed by warming the mixture to 50° C. and blending. The resultant liquid was readily pourable. There was then added 0.92% by weight of platinum complexed with methylvinyl tetramer as catalyst (Karstedt) and 0.92% by weight of dimethylmaleate inhibitor.

EXAMPLE 2

To 38 grams of the silicone resin solution prepared in Example 1 there was added 2 grams of a mixed $C_{16}$–$C_{18}$ α-olefin (Gulf Oil Chemicals Company). The mixture was blended until a uniform solution having a viscosity of 28,850 centipoise at 25° C. was obtained. One percent by weight of platinum catalyst (Karstedt) was also added to the solution and blended therein.

EXAMPLE 3

To 190 grams of the silicone resin solution prepared in Example 1 there was added 10 grams of mixed $C_{16}$–$C_{18}$ α-olefin, 2 grams of platinum catalyst (Karstedt) and 2 grams dimethylmaleate inhibitor. The solution was blended until uniform and the viscosity was found to be 9150 centipoise at 25° C.

EXAMPLE 4

To a one liter three neck flask equipped as in Example 1 there was added 460 grams of the same $MD^{vi}Q$ resin and 225 grams of the same vinyl terminated polydimethylsiloxane. The siloxane resin solution was stripped under vacuum to remove the solvent. The resin to fluid ratio on a molar basis was 55:45, respectively. To this solution there was then added 0.4 grams platinum catalyst (Lamoreaux) and 3 grams dimethylmaleate inhibitor. Once the polymer was blended to disperse both catalyst and inhibitor, the polymer was maintained under 30 mm Hg vacuum at 60°–65° C. for thirty minutes. The resultant material had a viscosity of 32,800 centipoise at 25° C. To 254 grams of the thus prepared material was added 2.5 grams of dimethylmaleate inhibitor and 2.5 grams platinum catalyst (Karstedt). The resin to polymer ratio, on a mole basis, was 55:45.

EXAMPLE 5

To a one liter three neck flask equipped as in Example 1 there was added 457 grams of the same $MD^{vi}Q$ resin, 223 grams of the same vinyl terminated polydimethylsiloxane, and 25 grams of mixed $C_{16}$–$C_{18}$ α-olefin. The resin, fluid and reactive diluent were blended until uniform and then stripped to 150° C. at 25 mm Hg to remove the solvent of the $MD^{vi}Q$ resin. Thereafter, 3.5 grams platinum catalyst (Karstedt) and 1.9 grams dimethylmaleate were added and the material blended until uniform. The resultant material had a viscosity of 16,700 centipoise at 25° C. The resin to polymer ratio, on a mole basis, was 55:45.

EXAMPLE 6

To a one liter three neck flask equipped as in Example 1 there was added 426 grams of the same $MD^{vi}Q$ resin, 255 grams of the same vinyl terminated polydimethylsiloxane, and 25 grams of mixed $C_{16}$–$C_{18}$ α-olefin. The resin, fluid and diluent were blended until uniform, then stripped to 150° C. at 25 mm Hg to remove solvent contained in the $MD^{vi}Q$ resin. Thereafter, 3.5 grams of platinum catalyst (Karstedt) and 1.9 grams of dimethylmaleate were added. The resultant material had a viscosity of 5800 centipoise at 25° C. The resin to polymer ratio was, on a mole basis, 50:50.

EXAMPLE 7

To a one liter three neck flask equipped as in Example 1 there was added 404 grams of the same $MD^{vi}Q$ resin, 270 grams of the same vinyl terminated polydimethylsiloxane, and 27 grams of mixed $C_{16}$–$C_{18}$ α-olefin. The resin, fluid and diluent were blended until uniform, and then stripped to 150° C. at 25 mm Hg to remove the solvent of the $MD^{vi}Q$ resin. Thereafter, 3.5 grams of platinum catalyst (Karstedt) and 1.9 grams dimethylmaleate inhibitor were added. The resultant material had a viscosity of 10,050 centipoise at 25° C. The resin to polymer ratio, on a mold basis, was 45:55.

EXAMPLE 8 To 11.1 grams of the material prepared in Example 1 there was added 1.2 grams of hydride containing MQ resin. The catalyzed polymer was cast on a metal sheet and cured at 150° C. Tensile strength, elongation and hardness were measured according to standard test procedures and the results are set forth in Table 1.

EXAMPLE 9

To 10 grams of the material prepared in Example 2 there was added 0.7 grams of hydride containing MQ resin. The catalyzed polymer was cast on a metal sheet and cured at 150° C. Tensile strength, elongation and hardness were measured according to standard test procedures and the results are set forth in Table I.

EXAMPLE 10

To 20 grams of the material prepared in Example 3 there was added 2 grams of hydride containing MQ resin. The catalyzed polymer was cast in a Teflon ® mold and cured at 150° C. Tensile strength, elongation and hardness were measured according to standard test procedures and the results are set forth in Table 1.

EXAMPLE 11

To 20 grams of the material prepared in Example 4 there was added 2 grams of hydride containing MQ resin. The catalyzed polymer was cast in a Teflon ® mold and cured at 150° C. Tensile strength, elongation and hardness were measured according to standard test procedures and the results are set forth in Table 1.

EXAMPLE 12

To 30 grams of the material prepared in Example 5 there was added 1.5 grams of trimethyl stopped methylhydrogenpolysiloxane having a viscosity of about 25 centipoise at 25° C. The catalyzed polymer was cast in a Teflon ® mold and cured at 150° C. Tensile strength, elongation and hardness were measured according to standard test procedures and the results are set forth in Table I.

EXAMPLE 13

To 30 grams of the material prepared in Example 6 there was added 1.5 grams of trimethyl stopped methylhydrogenpolysiloxane having a viscosity of about 25 centipoise at 25° C. The catalyzed polymer was cast in a Teflon ® mold and cured at 150° C. Tensile strength, elongation and hardness were measured according to standard test procedures and the results are set forth in Table I.

EXAMPLES 14 and 15

To 30 grams of the material prepared in Example 7 there was added 3 grams of hydride containing MQ resin and 1.5 grams of trimethyl endstopped methylhydrogenpolysiloxane (Examples 14 and 15, respectively). The catalyzed polymer was cast in a Teflon ® mold and cured at 150° C. Tensile strength, elongation and hardness were measured according to standard test procedures and the results are set forth in Table 1.

TABLE I

| Example | Tensile (psi) | Elongation (%) | Hardness (Shore A) |
|---|---|---|---|
| 8 | 781 | 100 | 72 |
| 9 | 580 | 100 | 62 |
| 10 | 785 | 100 | 74 |
| 11 | 481 | 60 | 82 |
| 12 | 1113 | 100 | 69 |
| 13 | 1270 | 120 | 64 |
| 14 | 828 | 100 | 59 |
| 15 | 875 | 100 | 61 |

The foregoing examples show that the additon of reactive diluents such as mixed $C_{16}$–$C_{18}$ α-olefins and Chemlink 2000 provides curable polymers which are easily pourable at room temperature. In order to obtain a durometer (hardness) in the 60 to 80 range, the level of $MD^{vi}Q$ resin has to be greater than about 25% by weight.

All of the foregoing examples cured rapidly, had a satisfactory pot life, had acceptable physical characteristics, and were easily stripped from fiber glass. Such compositions are also likely to be well suited for use as paper release compositions.

We claim:

1. An article of manufacture, comprising:
   I. a substrate; and
   II. a coating layer disposed on said substrate comprising the reaction product of:
      (a) 100 parts by weight of a substantially linear olefinic group-containing polydiorganosiloxane;
      (b) from about 50 to about 400 parts by weight of a resinous olefinic group-containing polysiloxane per 100 parts by weight of component (a);
      (c) from about 0.5 to about 25 percent by weight based on the weight of components (a) and (b) of an organic monomer capable of reacting with the hydrogen atoms of component (d);
      (d) an organohydrogenpolysiloxane crosslinking agent in an amount sufficient to provide from about 0.8 to about 3 silicon-bonded hydrogen atoms per alkenyl radical in components (a), (b), and (c); and
      (e) an effective amount of precious metal or precious metal containing hydrosilation catalyst.

2. An article of manufacture as in claim 1, wherein the substrate is a core of high transparency silica glass.

3. An article of manufacture as in claim 2, wherein the olefinic group-containing polydiorganosiloxane has the general formula

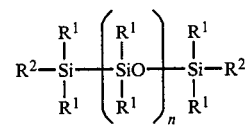

where each $R^1$ is an independently selected monovalent substituted or unsubstituted, saturated or unsaturated hydrocarbon radical, $R^2$ is an alkenyl radical, and n is a number sufficient to provide a viscosity of from about 10 centipoise to about 5,000,000 centipoise at 25° C.

4. An article of manufacture as in claim 3, wherein the $R^2$ radicals are vinyl or allyl radicals.

5. An article of manufacture as in claim 3, wherein the viscosity ranges from about 100 centipoise to about 1,000,000 centipoise at 25° C.

6. An article of manufacture as in claim 4, wherein the viscosity ranges from about 1000 centipoise to about 250,000 centipoise at 25° C.

7. An article of manufacture as in claim 2, wherein the resinous olefinic group-containing polysiloxane is an MQ resin or an MDQ resin.

8. An article of manufacture as in claim 7, wherein the resin has from about 1.5 to about 10 mole percent of siloxy units containing silicon-bonded alkenyl groups.

9. An article of manufacture as in claim 3, wherein there is from about 150 to about 250 parts by weight of MQ or MDQ resin per 100 parts by weight of olefinic group-containing polydiorganosiloxane.

10. An article of manufacture as in claim 2, wherein the reactive organic monomer is an $\alpha$-olefin.

11. An article of manufacture as in claim 10, wherein the $\alpha$-olefin has the general formula $$CH_3(CH_2)_x-CH=CH_2$$

where x is an integer from 1 to about 30.

12. An article of manufacture as in claim 11, wherein the value of x is from about 13 to about 27.

13. An article of manufacture as in claim 10, wherein the $\alpha$-olefin is present in an amount of from about 2.5 to about 20 percent by weight based on the weight of components (II) (a) and (II) (b).

14. An article of manufacture as in claim 10, wherein the $\alpha$-olefin is present in an amount of from about 5 to about 15 percent by weight based on the weight of components (II) (a) and (II) (b).

15. An article of manufacture as in claim 2, wherein the reactive organic monomer is an acrylated $\alpha$, $\omega$ aliphatic diol.

16. An article of manufacture as in claim 10, wherein the organohydrogenopolysiloxane is a silicone resin.

17. An article of manufacture as in claim 10, wherein the organohydrogenpolysiloxane is a silicone fluid.

18. A method for making an article of manufacture, comprising:
  I. applying to a substrate a curable composition comprising:
    (a) 100 parts by weight of a substantially linear olefinic group-containing polydiorganosiloxane;
    (b) from about 50 to about 400 parts by weight of a resinous olefinic group-containing polysiloxane per 100 parts by weight of component (a);
    (c) from about 0.5 to about 25 percent by weight based on the weight of component (a) and (b) of an organic monomer capable of reacting with the hydrogen atoms of component (d);
    (d) an organohydrogenpolysiloxane crosslinking agent in an amount sufficient to provide from about 0.8 to about 3 silicone-bonded hydrogen atoms per alkenyl radical in components (a), (b) and (c); and
    (e) an effective amount of precious metal or precious metal containing hydrosilation catalyst; and
  II. curing said composition.

19. A method as in claim 18, wherein the substrate is a core of high transparency silica glass.

20. A method as in claim 19, wherein the curable compositon is applied to the core of high transparency silica glass by dipping or spraying.

21. A method as in claim 20, wherein curing is effected by heating at a temperature of from about 200° C. to about 900° C., 22. A method as in claim 21, wherein heating is effected for about 0.1 to about 5 seconds.

* * * * *